US008732097B2

(12) United States Patent
Zhang et al.

(10) Patent No.: US 8,732,097 B2
(45) Date of Patent: May 20, 2014

(54) AUTOMATICALLY TRIGGERING PREDICTIONS IN RECOMMENDATION SYSTEMS BASED ON AN ACTIVITY-PROBABILITY THRESHOLD

(75) Inventors: Rui Zhang, San Francisco, CA (US); Kurt E. Partridge, Palo Alto, CA (US); Robert R. Price, Palo Alto, CA (US); James M. A. Begole, Los Altos, CA (US); Maurice K. Chu, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 255 days.

(21) Appl. No.: 13/402,751

(22) Filed: Feb. 22, 2012

(65) Prior Publication Data
US 2013/0218825 A1    Aug. 22, 2013

(51) Int. Cl.
*G06F 15/18* (2006.01)
(52) U.S. Cl.
USPC .......................................................... 706/12
(58) Field of Classification Search
USPC .......................................................... 706/52
See application file for complete search history.

(56) References Cited

U.S. PATENT DOCUMENTS 7,519,564 B2 *  4/2009  Horvitz ........................... 706/12
7,949,627 B2 *  5/2011  Aravamudan et al. .......... 706/62
8,566,165 B1 * 10/2013  Zhang et al. ............... 705/14.66

OTHER PUBLICATIONS

Location-based Predictions for Personalized Contextual Services using Social Network Data \Rui Zhang, Bob Price, Maurice Chu and Alan Walendowski Palo Alto Research Center Inc. (PARC, a Xerox Company) 3333 Coyote Hill Rd. Palo Alto CA 94304 Rui. zhang@parc.com.*

* cited by examiner

*Primary Examiner* — Kakali Chaki
*Assistant Examiner* — Ababacar Seck
(74) *Attorney, Agent, or Firm* — Shun Yao; Park, Vaughan, Fleming & Dowler LLP

(57) ABSTRACT

A recommender system determines a probability threshold for an activity-prediction model, and uses the probability threshold to predict whether a user is performing a target activity. To determine the probability threshold, the system computes a set of activity probabilities based on contextual information for a set of historical activities, and based on an activity-prediction model for a target activity. The system then compares a set of probability thresholds with the set of activity probabilities to determine a prediction success rate for each probability threshold. The system computes a utility score for each probability threshold based on the prediction success rates and a utility function, and selects a probability threshold whose utility score is optimal amongst the utility scores of the set of thresholds and greater than or equal to a baseline utility score. The system then assigns the probability threshold to the activity-prediction model.

21 Claims, 7 Drawing Sheets

AUTOMATICALLY TRIGGERING PREDICTIONS IN RECOMMENDATION SYSTEMS BASED ON AN ACTIVITY-PROBABILITY THRESHOLD

RELATED APPLICATION

The subject matter of this application is related to the subject matter in a co-pending non-provisional application by Rui Zhang, Kurt E. Partridge, James M. A. Begole, and Robert R. Price and filed on the same day as the instant application, entitled "A PERFORMANCE-EFFICIENT SYSTEM FOR PREDICTING USER ACTIVITIES BASED ON TIME-RELATED FEATURES," having Ser. No. 13/403,129, and filing date Feb. 23, 2012.

BACKGROUND

1. Field

This disclosure is generally related to activity-based recommender systems. More specifically, this disclosure is related to determining and using a probability threshold to make a decision on whether a user is performing a certain action.

2. Related Art

Advances in mobile computing have allowed people to consume digital information at any place and any time. It is common for laptops to boast a sufficiently long battery life to allow a user to complete a near full day of work on a single charge. If the user needs an Internet connection, the user is oftentimes able to find a public Wi-Fi hot spot at a local coffee shop or a public venue such as a park. As another example, the capabilities of smartphones have increased drastically to rival the computing abilities of laptops, while also providing steady access to the Internet through a cellular network. These advances have allowed users to perform their computing tasks at a coffee shop, on a park bench, or virtually anywhere. Oftentimes, a user may take his mobile phone out from his pocket for brief moments at a time to play a quick game while riding in a bus, to read the news while waiting in line at a store, or to search for information as necessary.

However, this mobile nature of modern computing has made it difficult to provide targeted recommendations to a user. Previous recommender systems expected a user to be using a computer at home or at work, with an open mind to consider recommendations. A modern computer user is constantly on the go, and may look at his mobile device for short periods at a time. The user may accept a recommendation if it matches his current activity, and may ignore a recommendation that isn't appealing or convenient considering his current activity.

For example, a typical recommender system may analyze behavior patterns for many individual users to make a recommendation that is targeted to a certain user. The recommender system may group multiple users that have a similar behavior pattern into a group, and may recommend a product or a service to an individual user based on purchases made by other users in his group. One example of this recommender system includes the movie recommendation system used by Netflix, Inc. to recommend movies to a viewer based on the movie ratings of other similar users. Another example is the product recommendation system used by Amazon, Inc. to recommend products to the user as the user browses Amazon's online catalog. However, these recommendations may not appeal to the user if they don't reach the user at an appropriate time. A user may be receptive to a coupon or advertisement for a pizzeria if he is at a mall with some friends, but may ignore the coupon if he receives it during or after eating dinner with his friends at a diner.

Other recommender systems compute acceptance-probabilities for one or more alternative recommendations, and choose a recommendation that has a highest acceptance-probability. However, if all the recommendations have a low acceptance probability, then it does not make sense to send any recommendation to the user.

Making a recommendation is a deterministic action. While there is a plethora of work of late on predicting the probability of user activities, little consideration has been given to whether to trigger a recommendation action based on the activity probability. The probability threshold for an activity-prediction model can have a significant impact on the accuracy of the recommendation decision, even if the activity-prediction model accurately predicts the probability of the target activity occurring. If the probability threshold is too low, many low-probability activities may be incorrectly predicted to take place. If the probability threshold is too high, many high-probability activities may be incorrectly predicted to not take place. This trade-off is easy to overlook. Often, users manually set a threshold, either on a random basis, or based on their subjective knowledge, which is often imprecise and incomplete.

SUMMARY

One embodiment provides a recommender system that determines a probability threshold for an activity prediction model. The system computes a first set of activity probabilities based on contextual information for a first set of historical activities, and based on an activity-prediction model for a target activity. An activity probability indicates a likelihood that the target activity has occurred. The system then compares a first set of probability thresholds with the first set of activity probabilities to determine a prediction success rate for each probability threshold. The system computes a utility score for each probability threshold based on the prediction success rates and a utility function, and selects a first probability threshold whose utility score is greater than or equal to a baseline utility score. The system then assigns the first probability threshold to the activity-prediction model.

In some embodiments, the prediction success rate includes at least one of: a number of true positive (TP) predictions; a number of true negative (TN) predictions; a number of false positive (FP) predictions; and a number of false negative (FN) predictions.

In some embodiments, the utility function has the form:

$$U(P_{th}) = U_1(TP) + U_2(FP) + U_3(FN) + U_4(TN).$$

In the utility function, $P_{th}$ is the threshold value used to determine whether a historical activity matches the target activity. Also, $U_1$ and $U_4$ compute a benefit of predicting a true positive and a true negative, respectively. Further, $U_2$ and $U_3$ compute a cost of predicting a false positive and a false negative, respectively.

In some variations, the system determines that the utility scores for the first set of probability thresholds are lower than the baseline utility score. Then, to find an optimal probability threshold, the system selects a second set of probability thresholds that has an average-deviation that is lower than that of the first set of probability thresholds. The system scores each probability threshold in the second set of probability threshold using the utility function to produce a second set of utility scores. The system then determines, based on the second set of utility scores, a probability threshold that has the highest utility score.

In some variations, the system determines that the utility score for the first probability threshold is greater than or equal to the baseline utility score. Then, to find an optimal probability threshold, the system selects a second set of probability thresholds whose range includes the first probability threshold and is smaller than that of the first set of probability thresholds. Also, the second set of probability thresholds has an average-deviation that is lower than that of the first set of probability thresholds. The system scores each probability threshold in the second set of probability threshold using the utility function to produce a second set of utility scores. The system then determines, based on the second set of utility scores, a second probability threshold that has the highest utility score.

In some variations, the system uses the utility function to compute the baseline utility score based on a plurality of randomly-selected historical activities.

In some variations, the system uses the utility function to compute the baseline utility score based on a plurality of most-popular or least-popular historical activities.

In some variations, the system uses the utility function to compute the baseline utility score for when no historical activities are selected.

In some embodiments, the system determines a second set of contextual information for a user, and processes the second set of contextual information using the activity-prediction model to determining an activity probability for the target activity. The system determines whether the user is performing the target activity by determining whether the activity probability is greater than or equal to the threshold value. The system then generates a recommendation for the user in response to determining that the user is performing the target activity.

In some embodiments, the contextual information includes one or more of: a geographic location; a motion trajectory; a date range; a logical name associated with a geographic location; a logical name associated with an activity description; a list of participants of the historical activity; and a set of keywords associated with the historical activity.

BRIEF DESCRIPTION OF THE FIGURES

In the figures, like reference numerals refer to the same figure elements.

DETAILED DESCRIPTION

Figure 1:
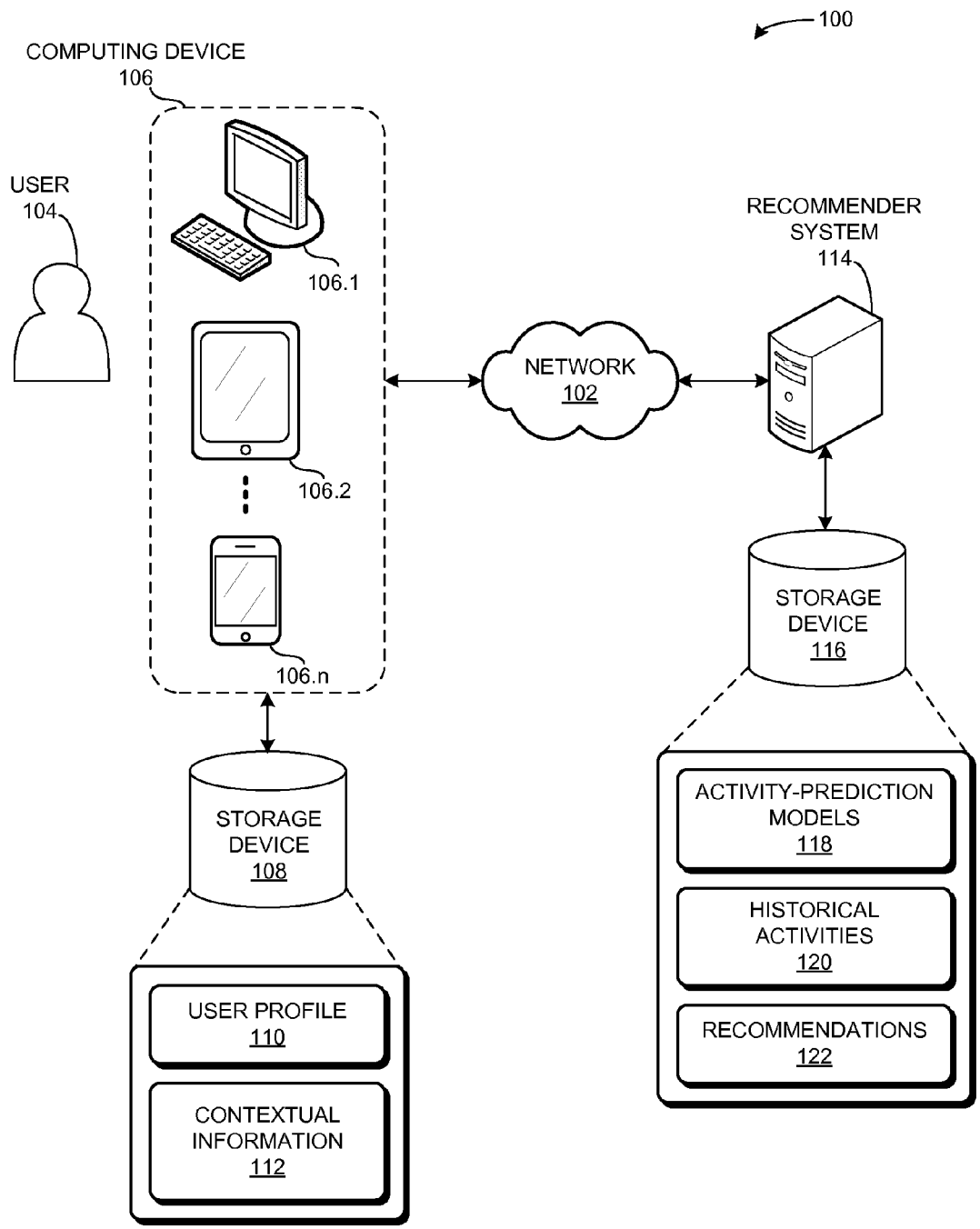
FIG. 1 illustrates an exemplary computing environment in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a recommender system that solves the problem of determining a probability threshold for an activity-prediction model. The system uses the activity-prediction model to compute a probability that a user is engaged in a certain target activity, and uses the probability threshold to make a deterministic prediction as to whether the user is or is not performing the target activity. The system can then make a recommendation to the user based on this determination.

During operation, the system collects and analyzes contextual information about the user from various sensor streams, and uses this contextual information to update the user's activity-prediction models that predict what the user may do next. Oftentimes, it is not clear what activity the user is about to perform until the user performs this activity. For example, if the user is driving in his car or walking in a shopping center, it is not clear where the user is traveling to until the user reaches his destination. While the activity probability facilitates understanding a user's behavior tendencies, the activity probability does not itself provide a deterministic prediction.

To make a recommendation, the system generates a probability threshold value for each activity-prediction model, and uses the probability threshold value to make a deterministic (yes/no) prediction as to whether the user is or is not going to perform the target activity. If the activity probability is lower than the probability threshold, the system can predict that the user is not going to perform a target activity. On the other hand, if the activity probability is greater than or equal to the probability threshold, the system can predict that the user is going to perform the target activity.

The recommender system uses the deterministic prediction about the user's activity to make a recommendation decision. The activity-based recommender system can make recommendation decisions for a variety of applications, such as to provide targeted messaging (e.g., advertisement or coupon selection), to provide a product recommendation, to optimize a transportation plan, to optimize a home energy-system, and to coordinate a social gathering for multiple people.

The probability threshold for an activity-prediction model can have a significant impact on the accuracy of the recommendation decision, even if the activity-prediction model accurately predicts the probability of the target activity occurring. If the probability threshold is too low, many low-probability activities may be incorrectly predicted to take place. If the probability threshold is too high, many high-probability activities may be incorrectly predicted to not take place.

In some embodiments, the system determines the probability threshold by computing a utility score for a plurality of probability thresholds, and selecting an optimal probability threshold that results in the highest utility score above a baseline utility score. By improving the accuracy provided by the probability thresholds, the system can also improve the accuracy of the recommendation decision, and can reduce the uncertainty in the decision's outcome.

FIG. 1 illustrates an exemplary computing environment 100 in accordance with an embodiment. Computing environment 100 can include network 102, a computing device 106, and a recommender system 114. Computing device 106 can include any personal computing device that gathers contextual information for a user 104. For example, computing device 106 can include a personal computer 106.1, a tablet computer 106.2, a smartphone 106.n, or any other computing device such as a laptop, an internet-enabled television, etc. Computing device 106 can be coupled to a storage device 108, which can store at least a user profile 110 and contextual information 112 for user 104.

During operation, computing device 106 can monitor the behavior and activities of user 104 to generate contextual information 112. Contextual information 112 can include a geographic location, a motion trajectory, a date range, a logical name associated with a geographic location, Email/short messaging service (SMS) messages, audio recordings, web page views, and any other information that is gathered about the behavior and actions of user 104. Computing device 106 can send contextual information 112 to recommender system 114 to receive a recommendation (e.g., an advertisement or a coupon) that is targeted to his current activity.

Recommender system 114 can include any computing device or group of computing devices coupled to network 102. Recommender system 114 can be coupled to a storage device 116, which can store at least activity-prediction models 118, historical activities 120 for one or more users, and product recommendations 122. A historical activity can include a snapshot of contextual information about user 104 for a period of time before the user performs a certain activity and/or while the user is performing the activity. The historical activity can also include a deterministic activity indicator that recommender system 114 can use to train the activity-prediction models and to determine a prediction threshold for each activity-prediction model. The deterministic activity indicator can include, for example, a geographic location and/or an activity that user 104 performs at the geographic location (e.g., jogging at Central Park), a name of a store, a name of an event, etc. Once the system trains the activity-prediction models and determines the probability thresholds that are fine-tuned for user 104, the system can generate a recommendation for user 104 when it receives new contextual information from computing device 106.

Figure 2:
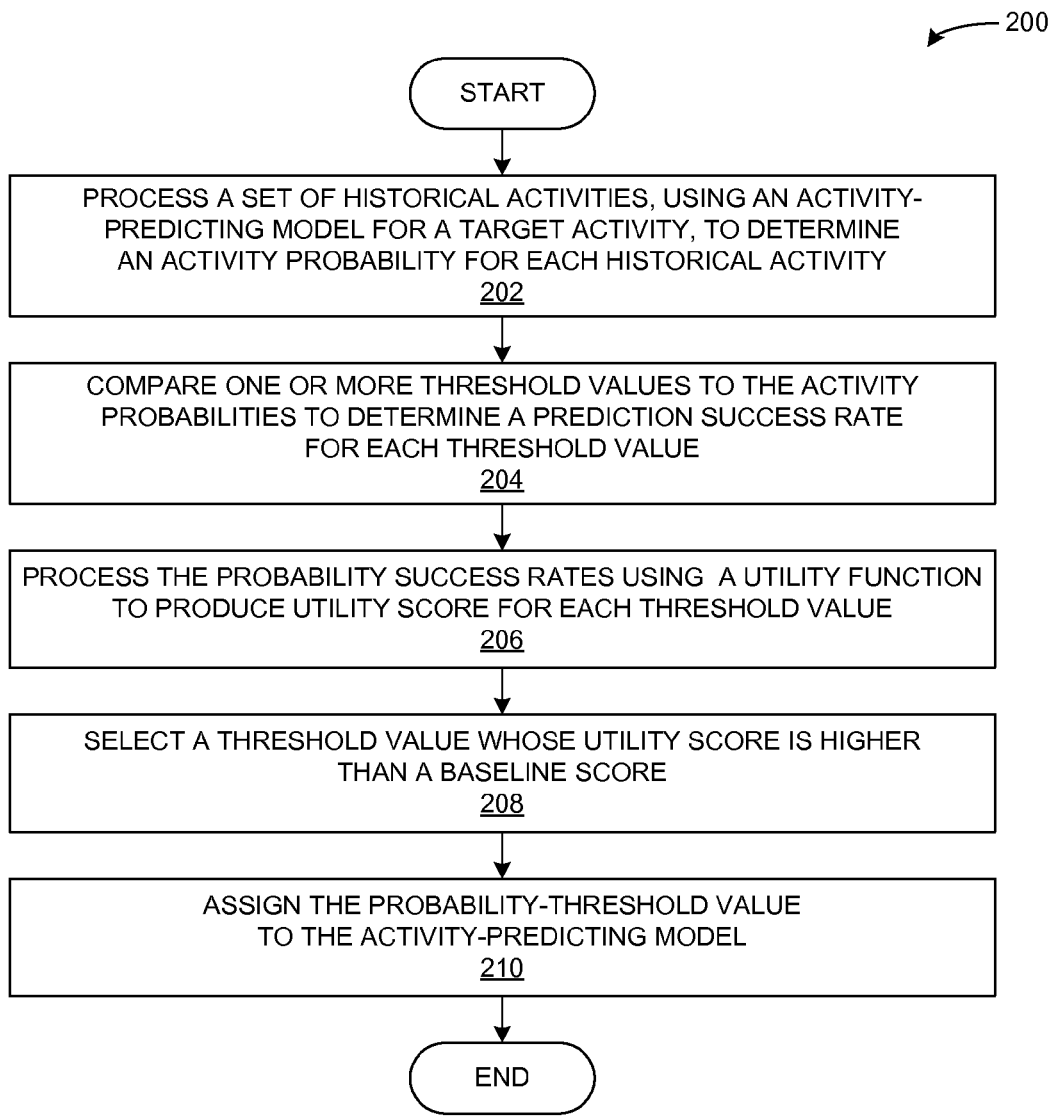
FIG. 2 presents a flow chart illustrating a method for determining a probability threshold for an activity-prediction model in accordance with an embodiment.

FIG. 2 presents a flow chart illustrating a method for determining a probability threshold for an activity-prediction model in accordance with an embodiment. During operation, the system can process a set of historical activities, using an activity-prediction model for a target activity, to determine an activity probability for each historical activity (operation 202). Each historical activity can include a set of contextual information that characterizes the activity. The activity-prediction model can take in the contextual information as input, and produces a probability that the historical activity matches the target activity.

The system then compares one or more threshold values to the activity probabilities to determine a prediction success rate for each threshold value (operation 204). Table 1 presents a set of exemplary prediction success rates for a threshold value in accordance with an embodiment. The prediction success rates can include a number of predictions that result in a true-positive (FP), a true-negative (TN), a false-positive (FP), and a false-negative (FN) prediction. For example, each of the historical activities can correspond to a geographic location visited by the user, and the target activity can include a target geographic location.

The system can compare the activity probabilities for the historical activities to a probability threshold to predict which historical activities match the target activity (e.g., which historical activities involve the user visiting the target location). If the probability threshold value causes the system to correctly predict that a historical activity matches the target activity, the system can count this prediction as a true-positive prediction. If the system correctly predicts that a historical activity does not match the target activity, the system can count this prediction as a true-negative prediction. However, if the threshold value causes the system to predict a match for a historical activity whose geographic location is different than that of the target activity, the system can count this prediction as a false-positive prediction. Also, if the system incorrectly predicts a historical activity to not match the target activity, the system can count this prediction as a false-negative prediction.

TABLE 1

Prediction Success Rates

|  | Visit | No Visit |
|---|---|---|
| Predict a Visit | TP | FP |
| Predict No Visit | FN | TN |

The system processes the prediction success rates using a utility function to produce a utility score for each threshold value (operation 206), and selects a threshold value whose utility score is higher than a baseline score (operation 208). The system then assigns the probability-threshold value to the activity-prediction model (operation 210).

Utility Function

The system uses a utility function, $U(P_{th})$, to compute a utility score that accounts for the benefits and costs that results from using a threshold $P_{th}$ to generate a binary (Yes/No) prediction from an activity probability. The utility function $U(P_{th})$ can have the form:

$$U(P_{th}) = U_1(TP) + U_2(FP) + U_3(FN) + U_4(TN) \qquad (1)$$

In equation (1), the prediction success rates TP and TN indicate the number of true positive and true negative predictions, respectively. The prediction success rates FP and FN indicate the number of false positive and false negative predictions, respectively. $U_1(TP)$ and $U_4(TN)$ represent benefits of making a correct prediction, and should be monotonically increasing positive values. $U_2(FP)$ and $U_3(FN)$ represent costs of making an incorrect prediction, and should be monotonically decreasing negative values.

One example for equation (1) can be:

$$U(P_{th}) = a_1(TP) + a_2(FP) - a_3(FN) - a_4(TN), \text{ where } a_i > 0 \qquad (2)$$

The system can either automatically determine the coefficient values for $a_i$ in equation (2), or the system can obtain the coefficient values from the user.

The prediction success rates TP, FP, FN, TN are themselves functions of $P_{th}$. The system computes these prediction success rates by comparing the predicted activities (determined from the contextual information of the historical activities) to the target activity.

In some embodiments, the system uses a leave-k %-out strategy to estimate the TP, FP, FN, TN given a set of training data. The system can use a first set of historical activities that includes (100−k) % of the training data to train the activity-prediction models. Then, the system can use a second set of historical activities that includes the remaining k % of the training data to compute the prediction success rates TP, FP, FN, TN, and to compute the utility scores for the activity-prediction models.

Computing a Baseline Score

In some embodiments, the system uses the utility function U( ) to compute a set of baseline utility scores for a certain activity-prediction model or target activity. Each baseline score provides a utility score that can be achieved if a certain commonsense approach is used to determine whether the user's contextual information matches the target activity. The system can use these baseline utility scores to search for a threshold value that results in a prediction accuracy that is at least as good as the common sense techniques. That is, a threshold value should result in a utility score that is at least equal to the baseline utility score.

The system can generate a baseline utility score for one or more of the following activity-selecting techniques: random; popularity; and cautious.

Random: The system selects a random activity among the alternatives.
Popularity: The system selects the most-popular or least-popular historical activity.
Cautious: The system doesn't select any activity.

The system then uses the utility function U( ) to compute a baseline utility score for each of the baseline activity-selecting techniques. U(Random) computes the utility score using a plurality of randomly-selected historical activities. U(Popularity) computes the utility score using a plurality of most-popular or least-popular historical activities. U(Cautious) computes the utility score when no historical activities are selected.

In some embodiments, the system generates the baseline utility score by selecting the maximum utility score from the set {U(Random), U(Popularity), U(Cautious)}. Then, when the system searches for the optimal probability threshold, the system uses the baseline utility score to select a probability threshold $P_{th}$ that satisfies the following three conditions:

$U(P_{th}) >= U(\text{Random})$ $U(P_{th}) >= U(\text{Popularity})$ $U(P_{th}) >= U(\text{Cautious})$ Searching for an Optimal Threshold Value In some instances, the set of probability threshold values P may not include a candidate threshold value that results in a higher utility score than the baseline utility score. This can happen when P includes a small number of candidate threshold values, or when only a small number of threshold values result in a utility score that is higher than the baseline score. In some embodiments, the system performs an iterative greedy algorithm that first searches the entire threshold range [0,1] at a coarse granularity to select a sub-range that can produce an optimal threshold value. The system then iteratively searches this promising sub-range at a finer granularity until the granularity of threshold values is deemed sufficiently fine.

Figure 3:
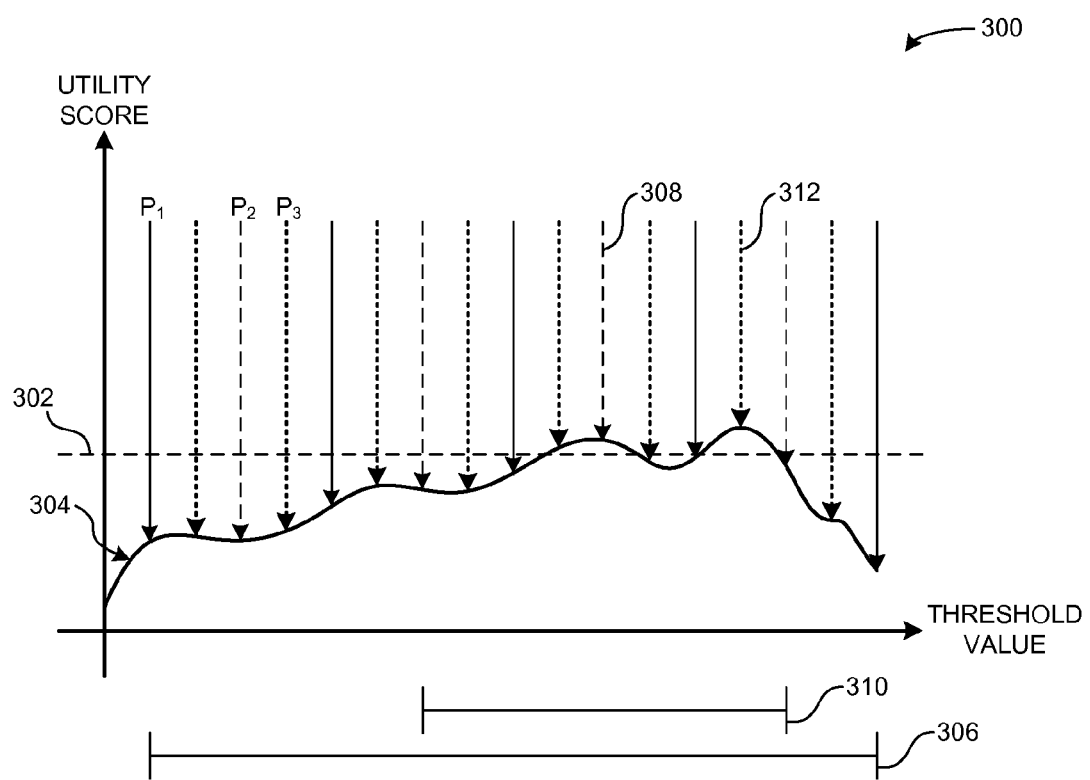
FIG. 3 presents an exemplary graph illustrating utility scores for a range of threshold values in accordance with an embodiment.

FIG. 3 presents an exemplary graph 300 illustrating utility scores for a range of threshold values in accordance with an embodiment. Graph 300 includes an x-axis for a set of threshold values, and includes a y-axis that represents utility scores. Graph 300 also includes a baseline utility-score curve 302, and a utility-score curve 304 that corresponds to a set of threshold values in a range 306 (e.g., the range [0,1]).

During the initial search iteration, the initial set of threshold values $P_1$ may only include values whose utility score is lower than baseline 302. FIG. 3 illustrates the set of threshold values in $P_1$ as solid lines within range 306. The system may then generate a second set of threshold values $P_2$ by decreasing the granularity of threshold values in range 306. FIG. 3 illustrates the set of threshold values in $P_2$ as solid and dashed lines within range 306, such that the dashed lines correspond to the additional threshold values.

After performing operation 206, the system may determine that threshold value 308 results in a utility score that is greater than baseline 302. However, threshold value 308 corresponds to a local maximum, which does not correspond to an optimal threshold value at a global maximum. The system can perform one or more additional iterations for a range near threshold value 308 to search for a global maximum utility score. To perform a third iteration, the system generates a third set of threshold values $P_3$ by decreasing the range so that it is near threshold value 308 (e.g., range 310), and by decreasing the search granularity within range 310. FIG. 3 illustrates the set of threshold values in $P_3$ as vertical lines within range 310, such that the dotted lines correspond to the additional threshold values. After performing operation 206 once again, the system determines that threshold value 312 results in a utility score that is greater than both baseline 302 and threshold value 308. The system then selects threshold value 312 during operation 208 as the optimal threshold value.

Figure 4:
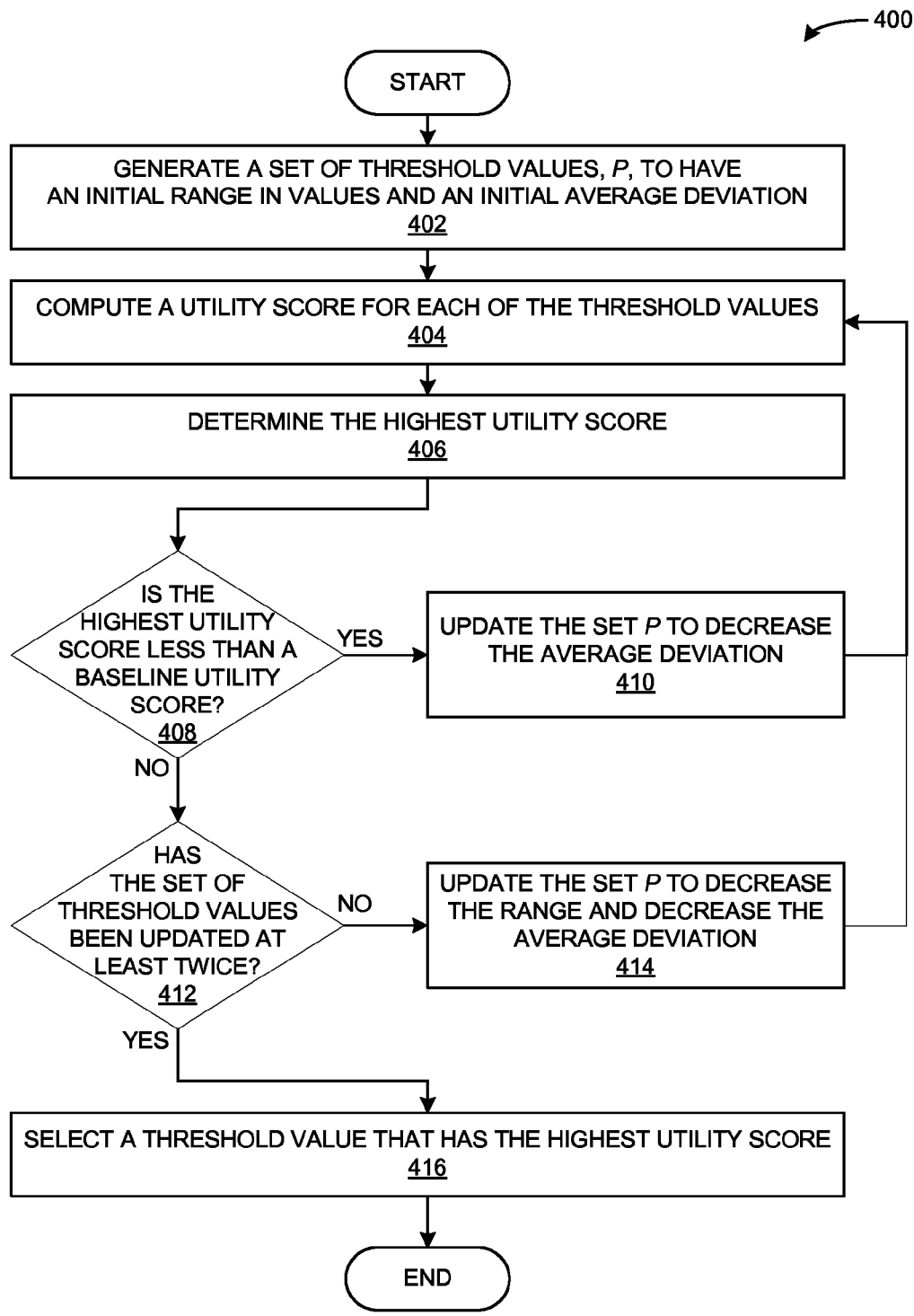
FIG. 4 presents a flow chart illustrating a method for iteratively refining a probability threshold for an activity-prediction model in accordance with an embodiment.

FIG. 4 presents a flow chart illustrating a method for iteratively refining a probability threshold for an activity-prediction model in accordance with an embodiment. During operation, the system generates a set of probability threshold values, P (operation 402). The threshold values in the set P fall within an initial range in values (e.g., the range [0,1]), and have a determinable average deviation, d. For example, if the system is generating the set P over the range $[P_{min}, P_{max}]$, the system can generate a total of $(P_{max}-P_{min})/d+1$ probability threshold values. In some embodiments, the system can generate P to include:

$$P = \{P_{min}, P_{min}+d, P_{min}+2*d, \ldots, P_{max}-2*d, P_{max}-d\} \quad (1)$$

The system computes a utility score for each of the threshold values in P (operation 404), and determines the highest utility score (operation 406). The system then determines whether the highest utility score is lower than a baseline utility score (operation 408). If so, the system can iteratively increase the granularity of threshold values in P until a threshold value is found that is greater than or equal to the baseline utility score. The system generates an updated set of threshold values P, such that the updated set has a lower average deviation (e.g., a smaller difference between any two neighboring threshold values in P) (operation 410). For example, the system can decrease the value of d (e.g., by a factor of 10), and can use equation (1) to generate the updated set P using the new average deviation d. The system then returns to operation 304 to evaluate each of the threshold values in the updated set P.

Recall that in some embodiments the system performs at least a certain minimum number of iterations (e.g., three iterations). Therefore, if the system determines at operation 408 that a certain threshold value results in a utility score that is greater than or equal to the baseline utility score, the system can proceed to determine whether the set of threshold values has been updated at least twice (operation 412). If so, the system updates the set P to decrease the range in threshold values, and to decrease the average deviation in P (operation 414), and returns to operation 304 to evaluate the threshold values in the updated set P. Otherwise, the system proceeds to select a threshold value that results in the highest utility score (operation 416).

Table 1 presents an exemplary pseudo code for iteratively refining a probability threshold for an activity-prediction model in accordance with an embodiment. Step 1 initializes a set of parameters that are used to generate the set of threshold values P, such that the range is initialized using the variables $P_{start}$ and $P_{end}$ to cover the range [0,1], and initializes the granularity by setting the deviation variable d to a 0.1. Then, step 2 generates P using these parameters, and step 3 computes the utility scores for the threshold values in P. If a threshold value $P_{th}$ with a utility score that is at least equal to the baseline score is not found, the deviations is decreased by a factor of 10 (at step 6), and code execution returns to step 2. Otherwise if not enough iterations have been performed (indicated by the DEPTH variable), the deviations is decreased by a factor of 10, the range is reduced to a range near $P_{th}$:$[P_{th}-5*d, P_{th}-5*d]$ (at steps 9 and 10), and code execution returns to step 2.

TABLE 1

1. DEPTH=0; $P_{start}$=0; $P_{end}$=1;d=0.1;
2. P = {$P_{start}$, $P_{start}$+d, ..., $P_{end}$-d, $P_{end}$}, DEPTH = DEPTH + 1;
3. FOR all $P_{th}$ in P, compute TP, FP, FN, TN, and U($P_{th}$);
4. Find $P_{th}$ in P with the highest utility score;
5. IF U($P_{th}$) >= baseline utility score, THEN GOTO Step #7;
6. ELSE {d = d/10; GOTO Step #2;}
7. IF DEPTH > 2 THEN EXIT;
8. ELSE GOTO Step #9;
9. d = d/10;// Increase search granularity
10. $P_{start}$=$P_{th}$-5*d; $P_{end}$=$P_{th}$-5*d; //reduce search to an area near$P_{th}$
11. GOTO Step #2;

Generating a Recommendation

Figure 5:
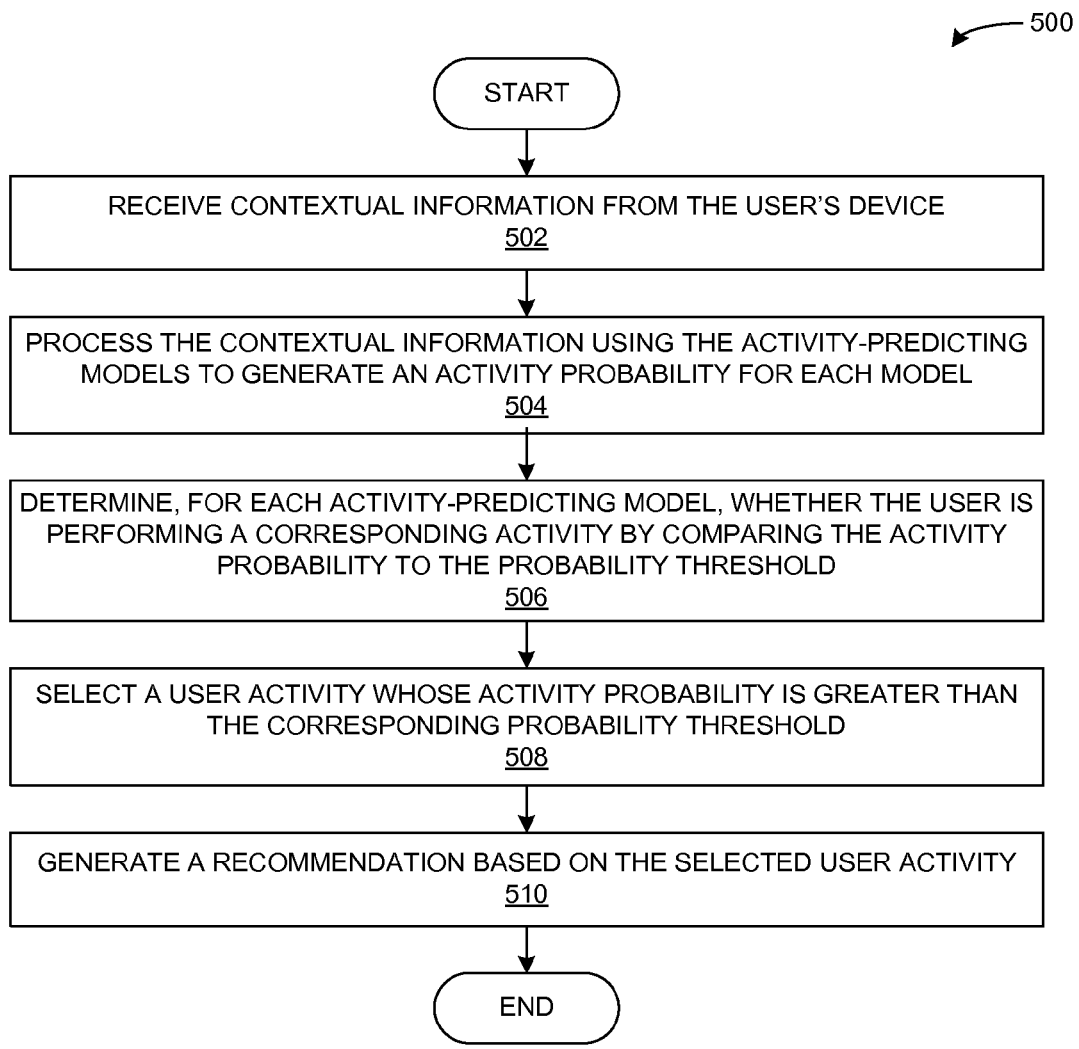
FIG. 5 presents a flow chart illustrating a method for generating a recommendation for a user in accordance with an embodiment.

FIG. 5 presents a flow chart illustrating a method for generating a recommendation for a user in accordance with an embodiment. During operation, the system can receive contextual information from the user's device (operation 502). The system processes the contextual information using one or more activity-prediction models to generate an activity probability for each model (operation 504). The system then determines, for each activity-prediction model, whether the user is performing a corresponding activity by comparing the activity probability to the probability threshold (506).

To generate a recommendation, the system can select a user activity whose activity probability is greater than the corresponding probability threshold (operation 508), and generates a recommendation for the user based on the selected user activity (operation 510). The recommendation can include an advertisement or coupon that is targeted to the user's current action. For example, if the user is driving to or walking in a shopping center, the system can make a prediction as to which grocery or retail store the user is about to enter. The system can then use this action prediction to select an advertisement or coupon for a certain merchandise item at this store, and presents this advertisement or coupon to the user.

Figure 6:
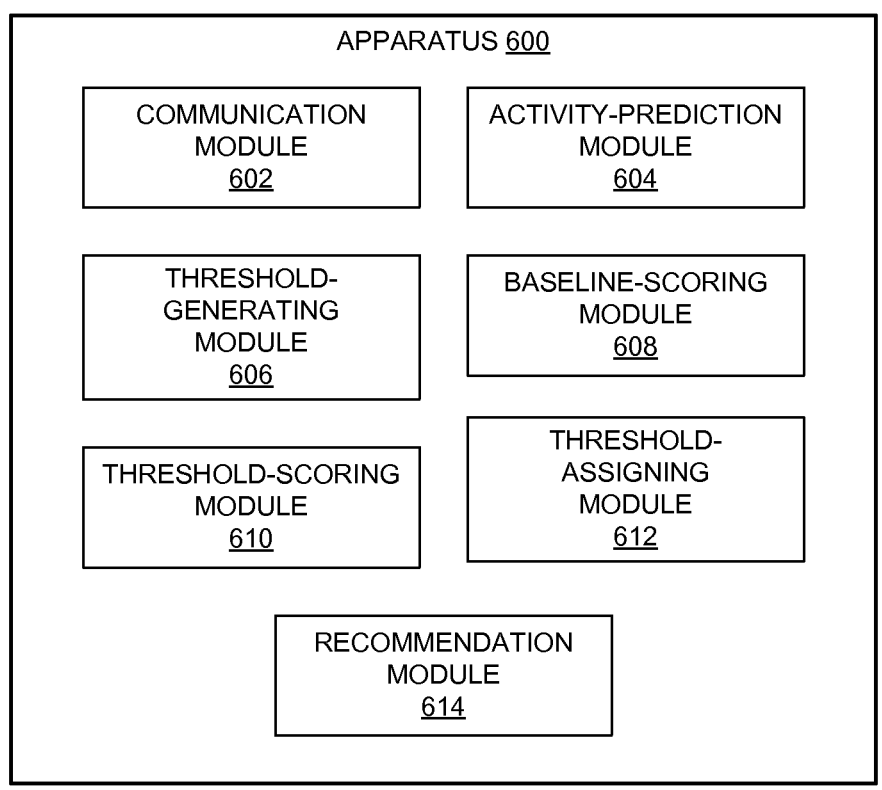
FIG. 6 illustrates an exemplary apparatus that facilitates selecting a probability threshold for an activity-prediction model in accordance with an embodiment.

FIG. 6 illustrates an exemplary apparatus 600 that facilitates selecting a probability threshold for an activity-prediction model in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, an event-prediction module 604, a threshold-generating module 606, a baseline-scoring module 608, a threshold-scoring module 610, a threshold-assigning module 612, and a recommendation module 614.

In some embodiments, communication module 602 can receive contextual information from a user's computing device. Event-prediction module 604 can process the contextual information to determine a set of activity probabilities. Threshold-generating module 606 can generate a set of probability thresholds. Baseline-scoring module 608 can use a utility function to compute the baseline utility score. Threshold-scoring module 610 can determine a prediction success rate for each probability threshold, produce a utility score for each probability threshold, and select an optimal probability threshold whose utility score is greater than or equal to a baseline utility score. Threshold-assigning module 612 can assign the optimal probability threshold to an activity-prediction model. Recommendation module 614 can determine whether the user is performing a target activity, and generates a recommendation for the user.

Figure 7:
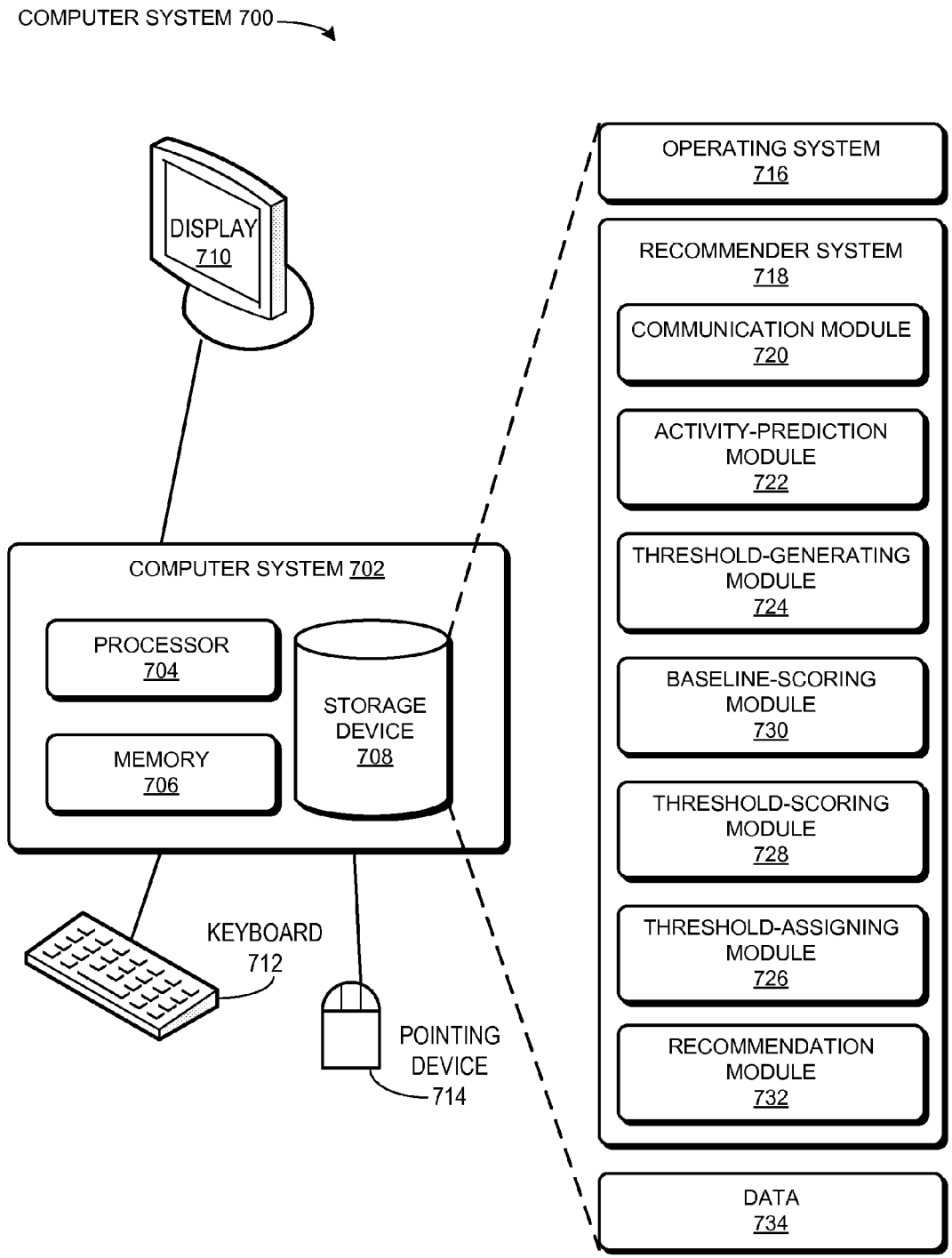
FIG. 7 illustrates an exemplary computer system that facilitates selecting a probability threshold for an activity-prediction model in accordance with an embodiment.

FIG. 7 illustrates an exemplary computer system 702 that facilitates selecting a probability threshold for an activity-prediction model in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, recommender system 718, and data 726.

Recommender system 718 can include instructions, which when executed by computer system 702, can cause computer system 702 to perform methods and/or processes described in this disclosure. Specifically, recommender system 718 may include instructions for receiving contextual information from a user's computing device (communication module 720). Recommender system 718 can include instructions for processing the contextual information to determine a set of activity probabilities (event-prediction module 722). Recommender system 718 can include instructions for generating a set of probability thresholds (threshold-generating module 724). Recommender system 718 can include instructions for using a utility function to compute the baseline utility score (baseline-scoring module 726). Recommender system 718 can include instructions for determining a prediction success rate for each probability threshold, producing a utility score for each probability threshold, and selecting an optimal probability threshold whose utility score is greater than or equal to a baseline utility score (threshold-scoring module 728). Recommender system 718 can include instructions for assigning the optimal probability threshold to an activity-prediction model (threshold-assigning module 730). Recommender system 718 can also include instructions for determining whether the user is performing a target activity, and generates a recommendation for the user (recommendation module 732).

Data 726 can include any data that is required as input or that is generated as output by the methods and/or processes described in this disclosure. Specifically, data 726 can store at least a user profile, historical or recent contextual information for a user, action-prediction models for the user, and prediction thresholds for the action-prediction models.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
computing, by a computing device, a first set of activity probabilities based on contextual information for a first set of historical activities and an activity-prediction model for a target activity, wherein an activity probability indicates a likelihood that the target activity has occurred;
comparing a first set of probability thresholds with the first set of activity probabilities to determine a prediction success rate for each probability threshold;
computing a utility score for each probability threshold based on the prediction success rates and a utility function, wherein the utility function has the form:

$$U(P_{th})=U_1(TP)+U_2(FP)+U_3(FN)+U_4(TN);$$

wherein $P_{th}$ is the threshold value used to determine whether a historical activity matches the target activity, wherein $U_1(TP)$ and $U_4(TN)$ compute a benefit of making a recommendation based on predicting a true positive and a true negative, respectively, and wherein $U_2(FP)$ and $U_3(FN)$ compute a cost of making a recommendation based on predicting a false positive and a false negative, respectively;
selecting a first probability threshold whose utility score is greater than or equal to a baseline utility score and other utility scores of the first set of thresholds; and
assigning the first probability threshold to the activity-prediction model.

2. The method of claim 1, wherein the prediction success rate includes at least one of:
a number of true positive (TP) predictions;
a number of true negative (TN) predictions;
a number of false positive (FP) predictions; and
a number of false negative (FN) predictions.

3. The method of claim 1, further comprising:
determining that the utility scores for the first set of probability thresholds are lower than the baseline utility score;
selecting a second set of probability thresholds that has an average-deviation that is lower than that of the first set of probability thresholds;
scoring each probability threshold in the second set of probability threshold using the utility function to produce a second set of utility scores; and
determining, based on the second set of utility scores, a probability threshold that has the highest utility score.

4. The method of claim 1, further comprising:
determining that the utility score for the first probability threshold is greater than or equal to the baseline utility score;
selecting a second set of probability thresholds whose range includes the first probability threshold and is smaller than that of the first set of probability thresholds, and wherein the second set of probability thresholds has an average-deviation that is lower than that of the first set of probability thresholds;
scoring each probability threshold in the second set of probability threshold using the utility function to produce a second set of utility scores; and
determining, based on the second set of utility scores, a second probability threshold that has the highest utility score.

5. The method of claim 1, further comprising computing the baseline utility score by using the utility function to compute one or more of:
U(Random);
U(Popularity); and
U(Cautious);
wherein U(Random) computes the utility score using a plurality of randomly-selected historical activities;
wherein U(Popularity) computes the utility score using a plurality of most-popular or least-popular historical activities; and
wherein U(Cautious) computes the utility score when no historical activities are selected.

6. The method of claim 1, further comprising:
determining a second set of contextual information for a user;
processing the second set of contextual information using the activity-prediction model to determining an activity probability for the target activity;
determining whether the user is performing the target activity by determining whether the activity probability is greater than or equal to the threshold value; and
generating a recommendation for the user in response to determining that the user is performing the target activity.

7. The method of claim 1, wherein the contextual information includes one or more of:
a geographic location;
a motion trajectory;
a date range;
a logical name associated with a geographic location;
a logical name associated with an activity description;
a list of participants of the historical activity; and
a set of keywords associated with the historical activity.

8. A non-transitory computer-readable storage medium storing instructions that when executed by a computer cause the computer to perform a method, the method comprising:
computing a first set of activity probabilities based on contextual information for a first set of historical activities and an activity-prediction model for a target activity, wherein an activity probability indicates a likelihood that the target activity has occurred;
comparing a first set of probability thresholds with the first set of activity probabilities to determine a prediction success rate for each probability threshold;

computing a utility score for each probability threshold based on the prediction success rates and a utility function, wherein the utility function has the form:

$$U(P_{th})=U_1(TP)+U_2(FP)+U_3(FN)+U_4(TN);$$

wherein $P_{th}$ is the threshold value used to determine whether a historical activity matches the target activity, wherein $U_1(TP)$ and $U_4(TN)$ compute a benefit of making a recommendation based on predicting a true positive and a true negative, respectively, and wherein $U_2(FP)$ and $U_3(FN)$ compute a cost of making a recommendation based on predicting a false positive and a false negative, respectively;

selecting a first probability threshold whose utility score is greater than or equal to a baseline utility score and other utility scores of the first set of thresholds; and assigning the first probability threshold to the activity-prediction model.

9. The storage medium of claim 8, wherein the prediction success rate includes at least one of:
a number of true positive (TP) predictions;
a number of true negative (TN) predictions;
a number of false positive (FP) predictions; and
a number of false negative (FN) predictions.

10. The storage medium of claim 8, wherein the method further comprises:
determining that the utility scores for the first set of probability thresholds are lower than the baseline utility score;
selecting a second set of probability thresholds that has an average-deviation that is lower than that of the first set of probability thresholds;
scoring each probability threshold in the second set of probability threshold using the utility function to produce a second set of utility scores; and
determining, based on the second set of utility scores, a probability threshold that has the highest utility score.

11. The storage medium of claim 8, wherein the method further comprises:
determining that the utility score for the first probability threshold is greater than or equal to the baseline utility score;
selecting a second set of probability thresholds whose range includes the first probability threshold and is smaller than that of the first set of probability thresholds, and wherein the second set of probability thresholds has an average-deviation that is lower than that of the first set of probability thresholds;
scoring each probability threshold in the second set of probability threshold using the utility function to produce a second set of utility scores; and
determining, based on the second set of utility scores, a second probability threshold that has the highest utility score.

12. The storage medium of claim 8, wherein the method further comprises computing the baseline utility score by using the utility function to compute one or more of:
U(Random);
U(Popularity); and
U(Cautious);
wherein U(Random) computes the utility score using a plurality of randomly-selected historical activities;
wherein U(Popularity) computes the utility score using a plurality of most-popular or least-popular historical activities; and
wherein U(Cautious) computes the utility score when no historical activities are selected.

13. The storage medium of claim 8, wherein the method further comprises:
determining a second set of contextual information for a user;
processing the second set of contextual information using the activity-prediction model to determining an activity probability for the target activity;
determining whether the user is performing the target activity by determining whether the activity probability is greater than or equal to the threshold value; and
generating a recommendation for the user in response to determining that the user is performing the target activity.

14. The storage medium of claim 8, wherein the contextual information includes one or more of:
a geographic location;
a motion trajectory;
a date range;
a logical name associated with a geographic location;
a logical name associated with an activity description;
a list of participants of the historical activity; and
a set of keywords associated with the historical activity.

15. An apparatus, comprising:
a processor;
a memory;
an event-prediction module to compute a first set of activity probabilities based on contextual information for a first set of historical activities and an activity-prediction model for a target activity, wherein an activity probability indicates a likelihood that the target activity has occurred;
a threshold-generating module to generate a first set of probability thresholds;
a threshold-scoring module to:
compare a first set of probability thresholds with the first set of activity probabilities to determine a prediction success rate for each probability threshold;
compute a utility score for each probability threshold based on the prediction success rates and a utility function, wherein the utility function has the form:

$$U(P_{th})=U_1(TP)+U_2(FP)+U_3(FN)+U_4(TN);$$

wherein $P_{th}$ is the threshold value used to determine whether a historical activity matches the target activity, wherein $U_1(TP)$ and $U_4(TN)$ compute a benefit of making a recommendation based on predicting a true positive and a true negative, respectively, and wherein $U_2(FP)$ and $U_3(FN)$ compute a cost of making a recommendation based on predicting a false positive and a false negative, respectively; and
select a first probability threshold whose utility score is greater than or equal to a baseline utility score and other utility scores of the first set of thresholds; and
a threshold-assigning module to assign the first probability threshold to the activity-prediction model.

16. The apparatus of claim 15, wherein the prediction success rate includes at least one of:
a number of true positive (TP) predictions;
a number of true negative (TN) predictions;
a number of false positive (FP) predictions; and
a number of false negative (FN) predictions.

17. The apparatus of claim 15, wherein in response to the threshold-scoring module determining that the utility scores for the first set of probability thresholds are lower than the baseline utility score, the threshold-generating module is further configured to generate a second set of probability thresholds that has an average-deviation that is lower than that of the first set of probability thresholds; and wherein the threshold-scoring module is further configured to:

score each probability threshold in the second set of probability threshold using the utility function to produce a second set of utility scores; and determine, based on the second set of utility scores, a probability threshold that has the highest utility score.

18. The apparatus of claim 15, wherein in response to the threshold-scoring module determining that the utility score for the first probability threshold is greater than or equal to the baseline utility score, the threshold-generating module is further configured to select a second set of probability thresholds whose range includes the first probability threshold and is smaller than that of the first set of probability thresholds, and wherein the second set of probability thresholds has an average-deviation that is lower than that of the first set of probability thresholds; and wherein the threshold-scoring module is further configured to:

scoring each probability threshold in the second set of probability threshold using the utility function to produce a second set of utility scores; and determining, based on the second set of utility scores, a second probability threshold that has the highest utility score.

19. The apparatus of claim 15, further comprising a baseline-scoring module to compute the baseline utility score by using the utility function to compute one or more of:

U(Random);
U(Popularity); and
U(Cautious);

wherein U(Random) computes the utility score using a plurality of randomly-selected historical activities;

wherein U(Popularity) computes the utility score using a plurality of most-popular or least-popular historical activities; and wherein U(Cautious) computes the utility score when no historical activities are selected.

20. The apparatus of claim 15, further comprising a recommendation module to:

determine a second set of contextual information for a user;

process the second set of contextual information using the activity-prediction model to determining an activity probability for the target activity;

determine whether the user is performing the target activity by determining whether the activity probability is greater than or equal to the threshold value; and generate a recommendation for the user in response to determining that the user is performing the target activity.

21. The apparatus of claim 15, wherein the contextual information includes one or more of:

a geographic location;
a motion trajectory;
a date range;
a logical name associated with a geographic location;
a logical name associated with an activity description;
a list of participants of the historical activity; and
a set of keywords associated with the historical activity.

* * * * *